United States Patent [19]

Herbec et al.

[11] Patent Number: 4,613,216
[45] Date of Patent: Sep. 23, 1986

[54] DEVICE FOR OBSERVATION THROUGH A WALL IN TWO OPPOSITE DIRECTIONS

[75] Inventors: Jean-Pierre Herbec, Villepreux; Michel Laisney, Cressely; Jacques Murat, Tulle; Patrick Serpeau, Creteil, all of France

[73] Assignee: L'Etat Francais, Paris, France

[21] Appl. No.: 713,887

[22] Filed: Mar. 20, 1985

[30] Foreign Application Priority Data

Mar. 27, 1984 [FR] France ................................ 84 04707

[51] Int. Cl.$^4$ ...................... G02B 23/02; G02B 23/08; G02B 5/08
[52] U.S. Cl. .................................... 350/618; 350/622; 350/617
[58] Field of Search ................. 350/618–620, 350/622–624, 621, 617

[56] References Cited

U.S. PATENT DOCUMENTS

| | | | |
|---|---|---|---|
| 2,173,106 | 9/1939 | Gerhardt | 350/618 |
| 2,310,939 | 2/1943 | Crawford | 350/622 |
| 2,854,882 | 10/1958 | Cooper | 350/623 X |
| 3,140,339 | 7/1964 | Nisperly et al. | 350/623 |
| 3,229,580 | 1/1966 | Mitchell | 350/618 |
| 3,619,040 | 11/1971 | Rickets | 350/618 X |
| 3,801,187 | 4/1974 | McMichael | 350/618 X |
| 4,123,151 | 10/1978 | Aurin | 350/622 |
| 4,291,946 | 9/1981 | van der Lely | 350/618 |
| 4,561,733 | 12/1985 | Kreischer | 350/618 |

Primary Examiner—John Petrakes
Attorney, Agent, or Firm—Parkhurst & Oliff

[57] ABSTRACT

An episcope is provided which allows viewing in either the forward or rearward directions through the same episcope. A parallelogram shaped main optical unit has a forward facing first objective lens and a first eyepiece lens. Light entering through the first objective lens strike one pair of faces of the main optical unit at an angle greater than or equal to the critical angle so that it is reflected by the parallel faces through the first eyepiece. An upper optical unit is disposed above the main optical unit and has a rearward facing objective lens. Light is reflected in the upper optical unit to pass into the main optical unit through the same face which reflected light coming from the first objective lens, the light from the second objective lens striking this face at an angle less than the critical angle. This light coming from the rearward direction is either reflected by a lower surface of the main unit to pass through the first or a second objective lens, or is transmitted entirely through the main optical unit into a lower optical unit, where it is reflected through a second eyepiece lens. The light beam coming through the first objective lens is reflected a total of an even number of times. The light beam entering through the second objective lens is reflected a total of an odd number of times. The upper, main and lower optical units may be separated from one another by layers of air.

17 Claims, 6 Drawing Figures

DEVICE FOR OBSERVATION THROUGH A WALL IN TWO OPPOSITE DIRECTIONS

BACKGROUND OF THE INVENTION

The technical area of this invention is that of observation devices allowing an observer inside a vehicle to see the vehicle's exterior surroundings.

Armored vehicles frequently are equipped with devices allowing the personnel to see outside. These devices, called episcopes, comprise a water-tight casing containing an optical unit with one or two prisms whose purpose is to transmit rays of light toward an eyepiece by means of an optical conveyance system comprising an even number of reflections. Episcopes of this type are described in French Pat. Nos. 2 365 137 and 2 496 905. Such episcopes are mounted so as to allow viewing in one direction only. The result is that the observer is obliged to move from one episcope to another if he wants to see in two opposite directions. Furthermore, as space is very limited inside such vehicles, the observer is obliged to turn around, which makes use of the rear episcope very awkward.

SUMMARY OF THE INVENTION

This invention seeks to remedy these drawbacks by providing an observation device which allows viewing of the vehicle's surroundings in two opposite directions and does so without requiring the observer to turn around to go from one direction of observation to the other.

Thus, the purpose of the invention is to provide a device for observation through a wall of an armored vehicle comprising a middle optical unit equipped with two pairs of parallel faces which transmit a beam of light from one objective lens toward a first eyepiece, thereby allowing observation of the exterior surroundings in a first (e.g., front) direction by the reflection of a beam of light on at least two of the parallel faces, the one above and the other below, characterized in that it further comprises at least one upper optical unit with a second objective lens working with the middle unit at the latter's upper face to transmit a beam of light coming from a second (e.g., rear) direction, opposite to the first, in order to convey the beam to the same or a second eyepiece with at least one reflection in the upper unit.

The upper and middle optical units can be separated by a layer of air.

The angle of inclination (relative to the perpendicular) of a beam of light from the lower edge of the total field in the first direction is greater than or equal to the critical angle of total reflection of the parallel faces. In contrast, beams of light are reflected by the upper optical unit onto its lower face at an angle of incidence lower than the critical angle of total reflection, then onto the upper face of the middle optical unit.

A beam of light coming from the second direction may be reflected in the middle optical unit, the total number of reflections of the beam in all the optical units being uneven and greater than or equal to 3. A single or multiple eyepiece can be used.

Alternatively, a beam coming from the second direction may be transmitted through the middle optical unit and reflected into a lower optical unit placed in the vicinity of the lower face of the middle optical unit, then toward a second eyepiece separate from the first, the total number of reflections in all of the optical units still being uneven and greater than or equal to 3.

One advantage of this invention is that the observer can view forward or aft without changing position.

Another advantage is that the interior structure of the vehicle can be simplified as a result of eliminating some of the episcopes.

Another result is that observation can be effectuated either from a single eyepiece or from two different eyepieces.

The invention described uses a conventional middle optical unit for forward viewing, and for more precise details one can consult the above-mentioned French patents. In this unit, rays of light striking the objective lens can be reflected two, four or six times before emerging. The unit's dimensions are entirely variable and some faces can be coated in order to ensure reflection. The topmost angle also is variable, so long as the conditions of total reflection of the incident beam coming from the first direction are satisfied.

In effect, the invention is an application of the well-known principle of reflection or transmission of a ray of light by a surface. Thus, in the following embodiments of the invention, the upper face of the middle optical unit is tilted with respect to the rays of light coming from the first direction in such a way that their angles of incidence will be greater than the critical angle of total reflection defined by the formula $\alpha_c = \arcsin(1/n)$, n being the index of refraction of the optical unit.

The rays of light coming from the second direction, opposite to the first, are reflected by the upper optical unit toward the middle unit, the two units working together to transmit the rays of light through their adjacent faces. Thus, the rays of light coming from the second direction and striking the lower face of the upper unit must have an angle of incidence lower than the critical angle of total reflection previously defined so that they may be transmitted to the middle optical unit. These rays may be conveyed by reflection either into or through the middle optical unit. In both cases, the total number of reflections of these rays of light must be uneven in number to give an upright image at the eyepiece. This number also must be greater than or equal to 3. For reasons of convenience, the preferred embodiments have only 3 reflections. Thus when the rays coming from the second direction are reflected into the middle optical unit, one can have either one reflection in the upper optical unit and two reflections in the middle optical unit or two reflections in the upper optical unit and one reflection in the middle optical unit. Similarly, when these rays are transmitted through the middle optical unit, and there is a lower optical unit, one can have either one reflection in the upper optical unit and two successive reflections in the lower optical unit or vice-versa.

BRIEF DESCRIPTION OF THE DRAWINGS

The above and other advantages to the present invention will become apparent from the following detailed description, which is made with reference to the following drawings.

DETAILED DESCRIPTION OF THE INVENTION

Figure 1A:
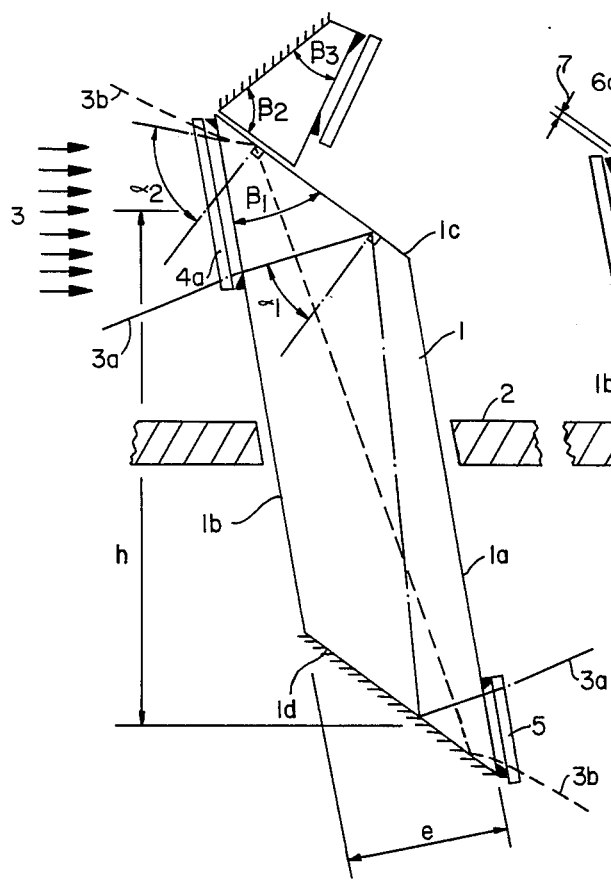
FIGS. 1A and 1B illustrate a first embodiment of the present invention in which two optical units are used.
Figure 1B:
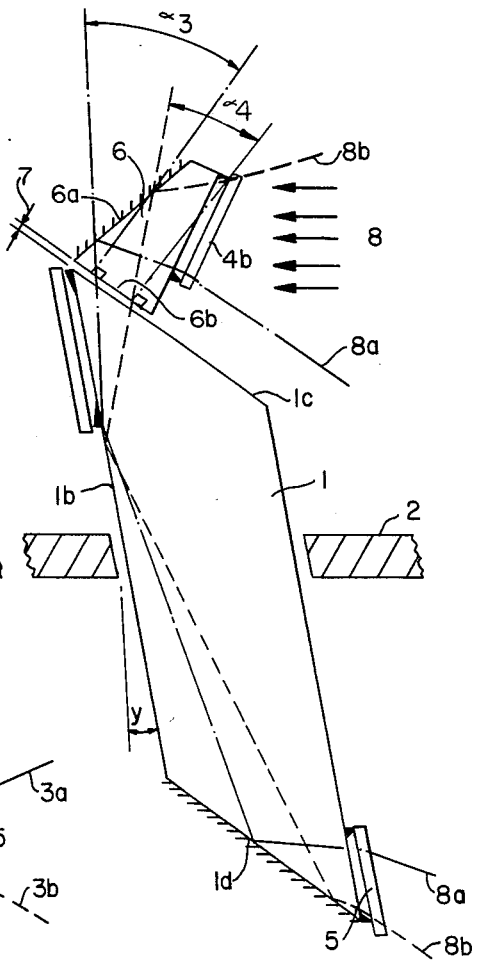
Figure 2A:
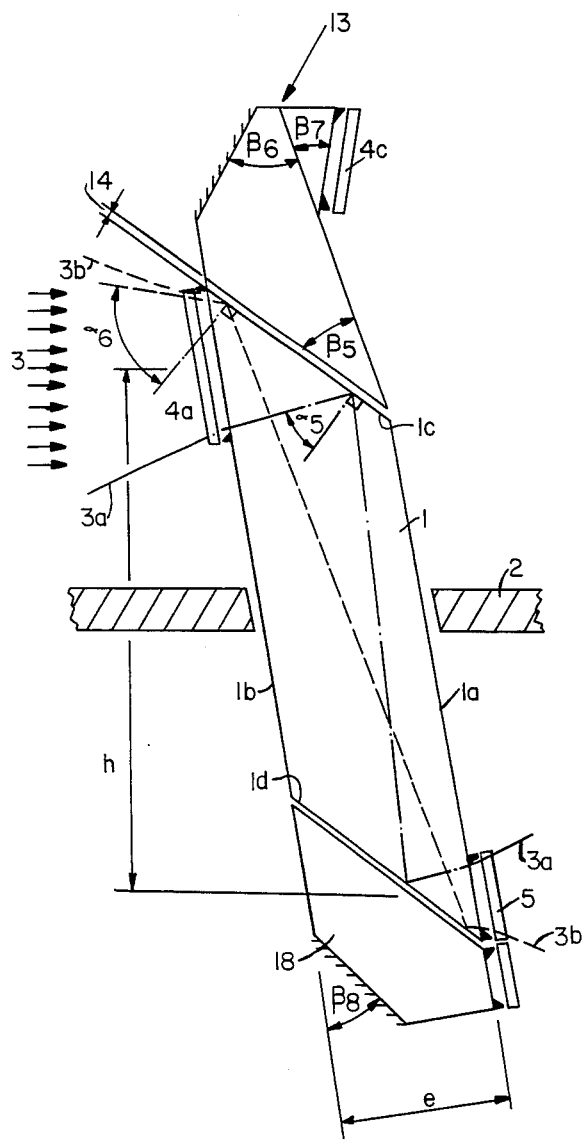
FIGS. 2A and 2B illustrate a second embodiment of the present invention using three optical units.
Figure 2B:
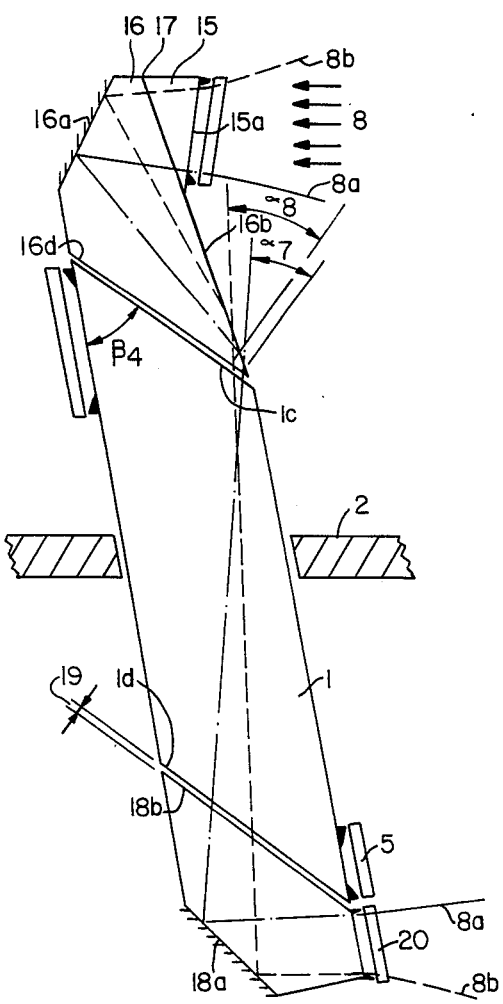

A first embodiment of the invention is shown in FIGS. 1A and 1B, and a second embodiment is shown in FIGS. 2A and 2B. For clarity, only the the beam of light coming from the left as seen in the drawings has been depicted in FIGS. 1A, 2A and only the beam coming from the right is shown in FIGS. 1B, 2b.

FIGS. 1A, 1B show an embodiment in which rays of light coming from the right undergo one reflection in an upper optical unit and two reflections in a middle optical unit. The device comprises an optical unit mounted on the wall of an armored vehicle and transmitting rays of light coming from the left, for example, from in front, through an exterior objective lens 4a to an eyepiece lens 5 inside the vehicle. This optical unit comprises a single prism with four lateral faces (1a, 1b, 1c, 1d) arranged in parallel pairs, with the two parallel faces 1c, 1d tilted with respect to the two other parallel faces 1a, 1b. Alternatively, the unit can comprise two prisms whose adjacent faces are parallel and separated in known fashion by a laser protective layer placed in the path of the rays of light.

The rays 3 undergo two successive reflections inside unit 1 on faces 1c and 1d. These faces being parallel, the rays 3 will be totally reflected by faces 1c, 1d when the inclination $\alpha_1$, of ray 3a at the lower edge of the total field and the inclination $\alpha_2$ of ray 3b on the upper edge of the total field are greater than the critical angle $\alpha_c$, which is about 42° when the optical units are of glass. To avoid detection by an outside observer who might notice stray reflections on the various lenses, unit 1 is inclined at an angle of 10° off the vertical. With this construction, if for example, unit 1 has an uppermost angle $\beta_1$ of 45°, episcope height h of 295 mm, episcope thickness e of 90 mm, and an objective lens measuring 63 mm, the total forward visual field is about 25°.

FIG. 1B shows the operation for light coming from the right, e.g., the rear. Above face 1c there is affixed an optical unit 6 comprising a single prism. This unit 6 is separated from unit 1 by a layer of air 7 of any given thickness. The purpose of this layer is to create the variance in the refractive index necessary to ensure total reflection of the rays 3 coming from the left. For purposes of convenience, the adjacent faces 1c and 6b are parallel to each other. The unit 6 receives the rays of light 8 coming from the right for, example, from the rear, through an objective lens 4b, and these rays are reflected by face 6a into unit 1. The angles of faces 6a and 6b of prism 6 are such that the rays 8 reflected by face 6a will have angles of incidence lower than the critical angle so that transmission across face 6b and 1c will be possible. This will happen whenever the angle of incidence $\alpha_3$ of ray 8a at the lower edge of the total field and the angle of incidence $\alpha_4$ of ray 8b at the upper edge of the total field are less than the critical angle $\alpha_c$. The rays 8 are reflected by face 1b and face 1d of optical unit 1, then exit at the level of the eyepiece 5. To ensure reflection of the rays 8, face 6a is treated with a reflective coating of a material such as silver or aluminum; faces 1b and 1d can also be so treated.

As can be seen, the eyepiece 5 is used both by the rays of light 3 coming from the left, for example, from in front, and by the rays of light 8 coming from the right, for example, from behind. Differentiation is effectuated by the inclination of the rays of light. The rays 3 emerge in parallel with their original direction, whereas rays 8 emerge titled slightly downwards. Forward observation will be done by keeping the eye in the middle of the eyepiece, whereas observation to the rear will require a slight tilting of the head, with the eye looking upward. With this construction, if the angle $\beta_2$ between faces 6a and 6b is 71°, the angle $\beta_3$ between the face 6a and the objective 4b is 26°, and with an objective 4b measuring 47 mm, the total field of vision to the rear is about 15°.

FIGS. 2A and 2B depict an optical device which is similar to the first embodiment for forward viewing, but somewhat different when it comes to rearward viewing. This embodiment uses two reflections in the upper optical unit and one reflection in a lower optical unit. The dimensions of the middle optical unit 1 can be varied while maintaining the angles of inclination $\alpha_5$ and $\alpha_6$ of the rays at the upper and lower edges of the total field. In general, however, the middle unit 1 of this embodiment is of substantially the same structure and function as unit 1 of the first embodiment. Thus, if the device's episcopic height h is 343 mm, its thickness e is 75 mm, its top angle $\beta_4$ is about 43°, with an objective lens 4a measuring 60 mm and an eyepiece lens 5 measuring 30 mm, one obtains a 22° forward field of vision.

Rearward viewing is accomplished differently from the first embodiment. An upper optical unit 13 is provided at the level of the upper face 1c of unit 1, and the two units are separated by a layer of air 14 of any given thickness. Unit 13 comprises 2 prisms 15 and 16 which may or may not be separated by a layer of air 17. Prism 15 receives rays of light 8 coming from the right, for example, from behind, and its input face 15a has a negative incidence of approximately 10° off the vertical. It transmits the beam of light to prism 16, whose faces 16a and 16b work together to give 2 reflections of the rays 8 and to transmit them to unit 1. The inclination of faces 16a and 16b is designed so that the rays reflected by face 16b toward face 16d have an angle of incidence lower than the critical angle, thereby allowing transmission across faces 16d and 1c. This will happen when the angles of inclination $\alpha_7$ and $\alpha_8$ of the rays of light at the lower edge 8a of the total field and at the upper edge 8b, respectively, of the total field are less than the critical angle of total reflection $\alpha_c$.

The rays 8 cross unit 1 without reflection and are received by the lower optical unit 18 placed at the level of the lower face 1d of unit 1 and from which the lower unit is separated by a layer of air 19. In this embodiment face 1d is at most partially coated, and preferably is left un-coated. The lower optical unit comprises, specifically, a face 18a, which may be coated, serving to reflect the ray 8 toward an eyepiece lens 20 which is distinct from eyepiece lens 5.

The prism 18 allows total separation of the front and rear beams of light. Thus, the two beams of light are physically separated and the observer has two openings to look through and can thus see in each of two opposite directions.

As an illustration, angles $\beta_5$, $\beta_6$, $\beta_7$, and $\beta_8$ can have the following respective values : 33°, 46°, 30° and 34°. With an objective lens 4c on the order of 40 mm and an eyepiece lens 20 of 26 mm, the total visual field to the rear is about 11°.

Figure 3:
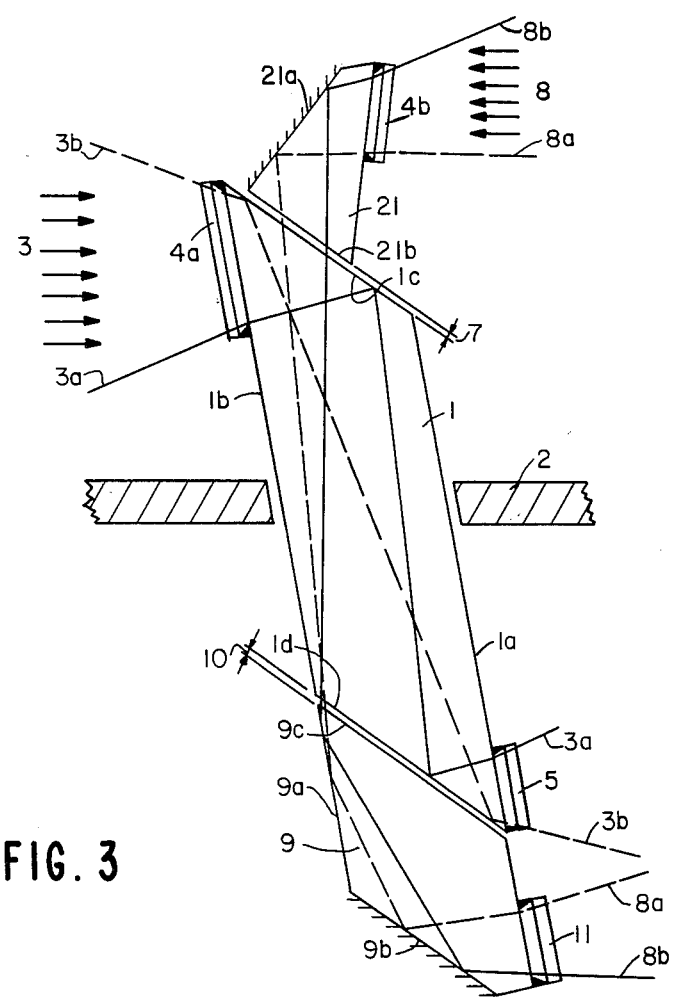
FIG. 3 illustrates a third embodiment, also using three optical units.

FIG. 3 depicts a third embodiment where the device comprises three optical units. Viewing in the first direction, for example, forward, is still done exactly as in the preceding cases by means of unit 1. Viewing in the second direction uses an upper optical unit 21 separated from the middle optical unit by a layer of air 7 of any given thickness. The rays 8 coming from the right for example, from the rear, undergo reflection in the upper optical unit 21 on its face 21a, crossing without reflection the adjacent faces 21b and 1c in optical units 21 and 1 and are transmitted to optical unit 9. Face 21a is inclined with respect to 21b in such a way that the incidence of the rays 8 on face 21b will be less than the critical angle $a_c$. Unit 1 is separated from unit 9 by a layer of air 10 between their adjacent faces 1d and 9c. As face 1d (again, at most partially coated) is parallel to face 1c, the condition necessary for the transmission of the rays 8 is satisfied and these rays exit at the level of aperture 11, which is distinct from aperture 5, after two successive reflections on faces 9a and 9b, which can be coated. The rays thus undergo one reflection in the upper unit and 2 reflections in the lower optical unit.

As an illustration, the dimensions of optical unit 1 can be identical to those given in FIGS. 1A and 1B.

Figure 4:
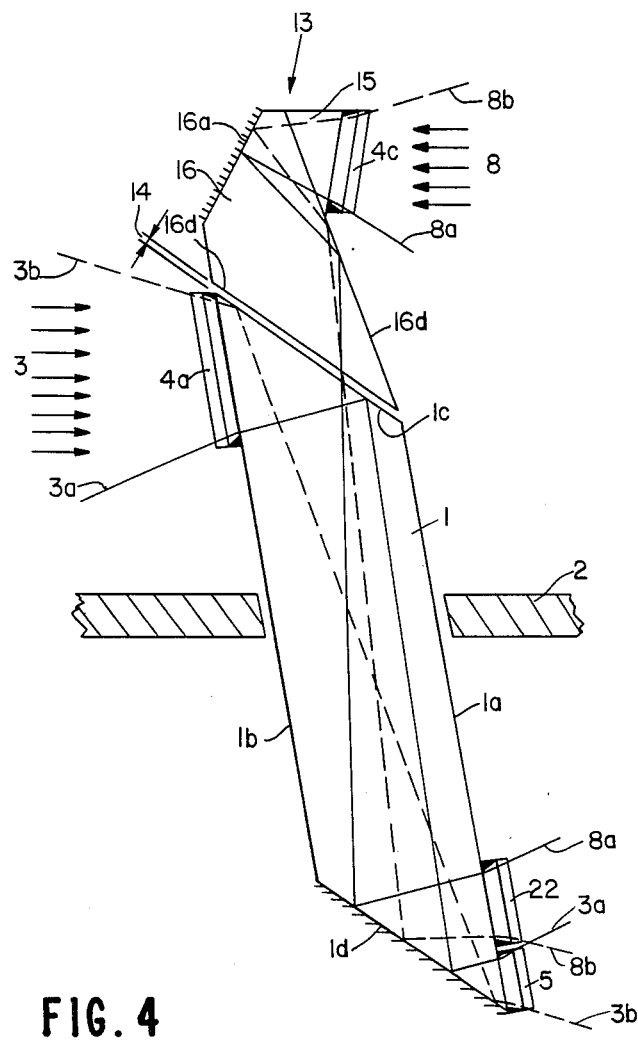
FIG. 4 illustrates a fourth embodiment, using two optical units.

FIG. 4 depicts a fourth embodiment where the device comprises two units. Here again, viewing in the first direction is done exactly as in the preceding cases by means of optical unit 1. The rays coming from the right, for example, from the rear, undergo two successive reflections in the upper optical unit 13, which comprises two prisms 15 and 16, and one reflection in the middle unit 1. The position of optical unit 13 with respect to unit 1 is the same as depicted in FIGS. 2A and 2B. The lower face 1d of unit 1 can be treated with a reflective coating for total reflection of the rays 8. These rays 8 exit through an eyepiece lens 22 which is distinct from eyepiece lens 5.

Various modifications and changes to the specific embodiments described above will be apparent to those of ordinary skill in the art without exceeding the scope of the present invention, which is defined by the claims below.

What is claimed is:

1. An optical device for observation through a wall, comprising:
    a main parallelogram-shaped optical unit having two pairs of parallel faces, a first objective lens disposed adjacent an upper end of said main unit, and a first eyepiece lens disposed adjacent an opposite end thereof and diagonally opposite said objective lens, the faces of the main optical unit being so angled relative to one another that a light beam entering through the first objective lens will be reflected by two of said faces to exit through said first eyepiece lens;
    an upper optical unit disposed above the upper end of said main optical unit and having a second objective lens and at least one reflective face for reflecting a light beam entering through said second objective lens into said main optical unit, said light beam entering through said second objective lens being reflected a total of an odd number of times by said at least one reflective face of said upper optical unit and at least one face of said main optical unit so as to exit through an eyepiece selected from the group consisting of said first eyepiece and a second eyepiece disposed adjacent to said first eyepiece.

2. The optical device of claim 1, wherein said light beam entering through said second objective lens is reflected by a single face in said upper optical unit and by two faces in said main optical unit to exit through said first eyepiece.

3. The optical device according to claim 1, wherein said light beam entering through said second objective lens is reflected by two faces of said upper optical unit and by a single face of said main optical unit to exit through said second eyepiece lens, said second eyepiece lens being disposed immediately above said first eyepiece lens.

4. The optical device of claim 1, wherein said main optical unit and said upper optical unit are separated by a layer of air.

5. The optical device of claim 1, wherein the angle of incidence of said reflecting faces of said main optical unit of a light beam entering through said first objective lens is greater than or equal to a critical angle of total reflection.

6. The optical device of claim 5, wherein a light beam entering through said second objective lens is transmitted into said main optical unit through one of the faces reflecting said light beam entering through said first objective lens, the angle of incidence of said second light beam upon said face being less than said critical angle.

7. An optical device for observation through a wall, comprising:
    a main parallelogram-shaped optical unit having two pairs of parallel faces, a first objective lens disposed adjacent an upper end of said main unit, and a first eyepiece lens disposed adjacent a lower end thereof and diagonally opposite said objective lens, the faces of the main optical unit being so angled relative to one another that a light beam entering through the first objective lens will be reflected by two of said faces to exit through said first eyepiece lens;
    an upper optical unit disposed above said main optical unit and having a second objective lens and at least one reflecting face for reflecting light entering through said second objective lens through said main optical unit;
    a lower optical unit disposed below said main optical unit and having a second eyepiece lens and at least one reflecting face for reflecting said light beam reflected by said upper optical unit through said main optical unit, said light beam entering through said second objective lens being reflected a total of an odd number of times by said at least one face of said upper optical unit and at least one face of said lower optical unit so that said light beam will exit through said second eyepiece lens.

8. The optical device of claim 7, wherein said light beam is reflected by two faces of said upper optical unit and by a single face of said lower optical unit.

9. The optical device of claim 7, wherein said light beam is reflected by a single face of said upper optical unit and by two faces of said lower optical unit.

10. The optical device of claim 9, wherein a light beam entering through said first objective lens is reflected by the same pair of faces through which said light beam entering through said second objective lens is transmitted, said light beam from said first objective lens being incident upon said pair of faces at an angle greater than or equal to the critical angle of reflection.

11. The optical device of claim 7, wherein a light beam entering through said second objective lens is transmitted through said main optical unit through a parallel pair of said faces of said main optical unit which reflect a light beam entering through said first objective lens, the angle of incidence upon said pair of faces of said light beam entering through said second objective lens being less than a critical angle of reflection.

12. The optical device of claim 7, wherein said upper optical unit is separated from said main optical unit by a layer of air and said lower optical unit is separated from said main optical unit by a layer of air.

13. The optical device of claim 7, wherein said upper optical unit comprises first and second prisms, said second objective lens being disposed on an outer surface of said first prism and said at least one reflecting surface being disposed on an inner surface of said second prism.

14. The optical device of claim 13, wherein said first and second prisms are separated by a layer of air.

15. The optical device of claim 7, wherein said first and second objective lenses have a negative inclination of about 10° off the vertical.

16. The optical device of claim 7, wherein said faces used solely for reflection are treated with a reflective coating selected from the group consisting of silver and aluminum.

17. The optical device of claim 7, further comprising at least one laser protective layer between said objective lenses and said eyepiece lenses.

* * * * *